United States Patent
Groenenboom et al.

[11] Patent Number: 5,329,284
[45] Date of Patent: Jul. 12, 1994

[54] RADAR APPARATUS

[75] Inventors: Albert Groenenboom; Bernard J. Reits, both of Hengelo, Netherlands

[73] Assignee: Hollandse Signaalapparaten B.V., Hengelo, Netherlands

[21] Appl. No.: 57,468

[22] Filed: May 6, 1993

[30] Foreign Application Priority Data

May 12, 1992 [NL] Netherlands ............... 9200837

[51] Int. Cl.⁵ .................................. G01S 13/08
[52] U.S. Cl. ............................. 342/132; 342/196
[58] Field of Search ........... 342/132, 122, 128, 196

[56] References Cited

U.S. PATENT DOCUMENTS

| | | |
|---|---|---|
| 4,028,700 | 6/1977 | Carey et al. |
| 4,379,295 | 4/1983 | Lewis et al. |
| 4,524,362 | 6/1985 | Lewis |
| 4,524,363 | 6/1985 | Kretschmer |
| 4,912,472 | 3/1990 | Reits ................. 342/128 |
| 5,023,618 | 6/1991 | Reits ................. 342/128 |

FOREIGN PATENT DOCUMENTS 0110260 6/1984 European Pat. Off.
0310172 4/1989 European Pat. Off.

*Primary Examiner*—Mark Hellner
*Attorney, Agent, or Firm*—Oblon, Spivak, McClelland, Maier & Neustadt

[57] ABSTRACT

Radar apparatus provided with a transmit generator and antenna means for the transmission of comparatively long, linearly frequency-modulated transmitter pulses. Echo signals are received by antenna means and a heterodyne signal is generated in mixer stage. Propagation time differences for different echo pulses are compensated by means of a dispersive delay element incorporated in the radar receiver. Distortion of the echo pulses in the dispersive delay element is corrected on the basis of a Fresnel ripple correction. A Fourier transformation unit transfers the corrected echo pulses to time domain video with low sidelobes.

22 Claims, 2 Drawing Sheets

RADAR APPARATUS

BACKGROUND OF THE INVENTION

The invention relates to a radar apparatus comprising transmitter means provided with a transmit generator for generating a transmitter pulse modulated at a frequency sweep rate and a reference signal modulated at the same frequency sweep rate; receiver means provided with a mixer stage for generating a heterodyne signal from the reflected transmitter pulse and the reference signal, a dispersive delay element for the frequency-dependent delay of the heterodyne signal; and a Fourier transformer unit provided with a weighting function for transforming the delayed heterodyne signal.

Such a radar apparatus is known from patent specification U.S. Pat. No. 4,912,472. This specification relates to a radar apparatus which linearly transmits frequency-modulated pulses at a 50% duty cycle, the received echo pulses being processed as is customary in a FMCW radar by mixing them in receiver means with a reference signal and subsequently digitizing, weighting and Fourier-transforming the resulting heterodyne signal. A non-simultaneous arrival of received echo pulses as a result of propagation time differences is solved by incorporating a dispersive delay element in the receiver means. Since both the echo pulse propagation time and the frequency of the heterodyne signal linearly depend on the distance between the radar apparatus and the target producing the echo pulse, a dispersive delay element of a suitably chosen dispersiveness is undoubtedly capable of compensating any propagation time differences.

A drawback of the signal processing in said radar apparatus is that any distortion of the heterodyne signal, wherever caused, may give rise, after Fourier analysis, to spurious targets.

SUMMARY OF THE INVENTION

The radar apparatus according to the invention aims at obviating this drawback and is characterised in that correction means have been provided for correcting distortion of the heterodyne signal. Said distortion is mainly found to be caused by the heterodyne signal passing through the dispersive delay element. The distortion is entirely predictable, however, and merely depends on the pulse length, the degree of dispersiveness of the dispersive delay element and on a tapering, applied to the transmitter pulse.

A first embodiment of the radar apparatus according to the invention is thereto characterised in that the correction means comprise a division of the weighting function by a first function which describes the distortion of the heterodyne signal in the dispersive delay element.

A second, most favourable embodiment of the radar apparatus according to the invention is characterised in that the correction means comprise a division of the weighting function by a second function which describes the distortion of the transmitter pulse in the transmitter means and the heterodyne signal in the dispersive delay element. The underlying idea of the invention is that the required incorporation of the correction means may conveniently serve to eliminate the transmitter pulse distortion. Since latter distortion can be influenced by time-dependent parameters, for instance the temperature of the transmitter means, this embodiment is further characterised in that means have been provided for analysing a signal distorted in the transmitter means and the dispersive element in order to obtain the second function.

BRIEF DESCRIPTION OF THE DRAWINGS

The invention will now be further described with reference to the following figures, of which.

DETAILED DESCRIPTION OF THE INVENTION

In a pulse radar apparatus, the distance to the target is determined in the time domain, as a delay between a transmitted pulse and a received echo pulse. In a linear FMCW radar apparatus this distance is determined in the frequency domain, as a frequency difference between a transmitted signal and a received echo signal. Fourier transformation of this heterodyne signal yields a radar signal which practically corresponds with the radar signal of a pulse radar apparatus and which is suitable for driving a pulse radar-specific radar display or a track computer.

Figure 1:
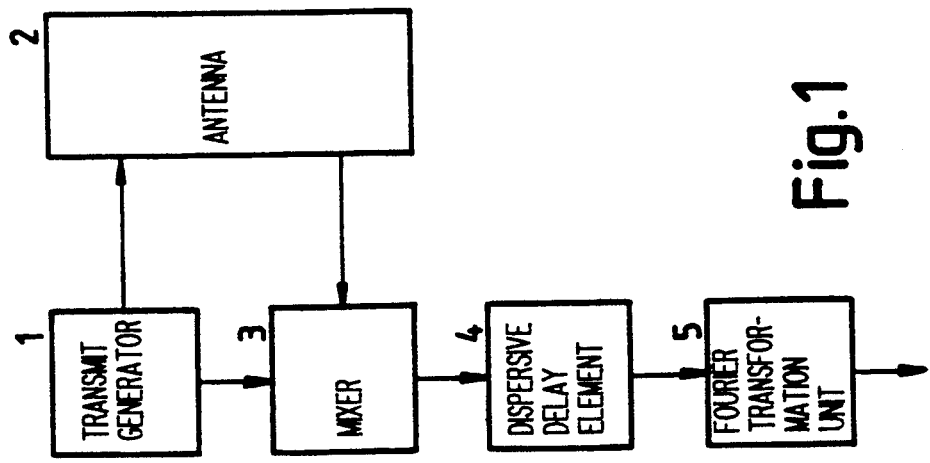
FIG. 1 represents a block diagram of a radar apparatus according to the invention.

FIG. 1 represents a block diagram of a radar apparatus according to the invention which combines features of an FMCW radar apparatus and a pulse radar apparatus. A transmit generator 1 generates a transmitter pulse which is applied to antenna means 2. The transmitter pulse has a duration $T_p$ and a linear frequency modulation of a bandwidth B. Transmit generator 1 also generates a reference signal with a linear frequency modulation, the frequency sweep rate of which corresponds with that of the transmitter pulse, which reference signal is applied to a first input of mixer stage 3. Echo signals are received by antenna means 2 and applied to a second input of mixer stage 3. The reference signal has a duration $T_p'$ with $T_p' = kT_p$, $k > 1$ and a bandwidth $B' = kB$. The transmitter pulse and reference signal are periodically generated and will always start simultaneously. Heterodyne signals at the output of mixer stage 3 will also reveal features of both a pulse radar apparatus and an FMCW radar apparatus.

Thus, the time delay will cause a heterodyne signal to contain the distance to the target, although this information will also be contained in the frequency of the echo signal. If the transmitter pulse and reference signal are substantially identical and only the reference signal is of a longer duration, both the time delay and the frequency are proportional to the distance.

According to the state of the art referred to in the introduction, it is advantageous to pass the heterodyne signals through a dispersive delay element 4, the dispersiveness of which has been selected such that time delays for different echo signals are compensated. All echo signals will then simultaneously leave the dispersive delay element 4 to be subsequently applied to Fourier transformation unit 5 provided with a weighting function. Thus, a type of processing inherent in an FMCW radar apparatus is used in a pulse radar apparatus. The resulting radar signal is however found to be less suitable for driving a radar display or a track computer on account of this signal being afflicted with time sidelobes, which cause false echoes on the display screen. This phenomenon is chiefly due to distortion of the heterodyne signal in dispersive delay element 4.

Supposing the input signal of the dispersive delay element is a signal f(t) with an angular frequency $\omega^*$ and a pulse length $T_p$, then $$f(t) = p_\sigma(t) e^{j\omega^* t} \quad (1)$$

where $$p_\sigma(t) = w_\sigma * p_0 \quad (2)$$

In this formula $$w_\sigma(t) = \frac{1}{\sigma\sqrt{2\pi}} e^{-\frac{1}{2}(t/\sigma)^2} \quad (3)$$

represents the tapering and the following applies $$p_0(t) = \begin{cases} 1 & \text{if } |t| \leq \tfrac{1}{2} T_p \\ 0 & \text{if } |t| > \tfrac{1}{2} T_p \end{cases} \quad (4)$$

The spectrum of this pulse is $$f(\omega) = P_0(\omega - \omega^*) w_\sigma(\omega - \omega^*) \quad (5)$$

where $$P_0(\omega) = 2T_p \operatorname{sinc}(\omega T_p) \quad (6)$$

and $$w_\sigma(\omega) = e^{-\frac{1}{2}\omega^2\sigma^2} \quad (7)$$

The input signal can now be represented as $$f(t) = \frac{1}{2\pi} \int_{-\infty}^{\infty} f(\omega) e^{j\omega t} d\omega \quad (8)$$

For the dispersive delay element 4 we assume that a harmonic input signal with an angular frequency $\omega$ will experience a delay of $\tfrac{1}{2}\alpha\omega$, $\alpha$ representing the dispersiveness of dispersive delay element 4.

An input signal $e^{j\omega t}$ consequently yields an output signal $e^{j\omega(t - \frac{1}{2}\alpha\omega)}$. Our input signal f(t) then results in an output signal $$\begin{aligned} f^*(t) &= \frac{1}{2\pi} \int_{-\infty}^{\infty} f(\omega) e^{j\omega(t - \frac{1}{2}\alpha\omega)} d\omega \\ &= e^{-\frac{1}{2}\alpha(\omega^*)^2} q_\sigma(t - \alpha\omega) e^{j\omega^* t} \end{aligned} \quad (9)$$

where $$q_\sigma(t) = \frac{1}{2\pi} \int_{-\infty}^{\infty} p_\sigma(\omega) e^{-\frac{1}{2}\alpha\omega^2} e^{j\omega t} d\omega \quad (10)$$

If we compare (1) and (9) we find
i) a phase shift of $\tfrac{1}{2}\alpha(\omega^*)^2$
ii) the pulse form $p_\sigma$ changing into $q_\sigma$
iii) a delay of $\alpha\omega^*$.

The first effect is irrelevant. The third effect is the intended effect. The second effect entails a ripple which adversely affects the pulse compression.

A simple calculation reveals that:

$$q_\sigma(t) = \tfrac{1}{2}\sqrt{2}\, e^{-j\frac{4}{\pi}} \left( F\left(\frac{t + \tfrac{1}{2} T_p}{\sqrt{\pi(\alpha - 2j\sigma^2)}}\right) - F\left(\frac{t - \tfrac{1}{2} T_p}{\sqrt{\pi(\alpha - 2j\sigma^2)}}\right) \right) \quad (11)$$

where F represents the Fresnel integral $$F(z) = \sqrt{\frac{2}{\pi}} \int_0^z e^{jt^2} dt, \; z \in C \quad (12)$$

Consequently, the ripple is a so-called Fresnel ripple.

From (11) it follows that the ripple only depends on the pulse length, on the dispersiveness of dispersive delay element 4 and possibly on a tapering of the transmitter pulse. It is therefore possible to obtain a radar signal which is suitable for driving a radar display or a track computer by making a correction for this ripple. A particularly opportune moment for this correction is during the weighting of the echo signals before they are applied to Fourier transformation unit 5. To this end, the weighting function can be divided by $q_\sigma(t)$.

Figure 2:
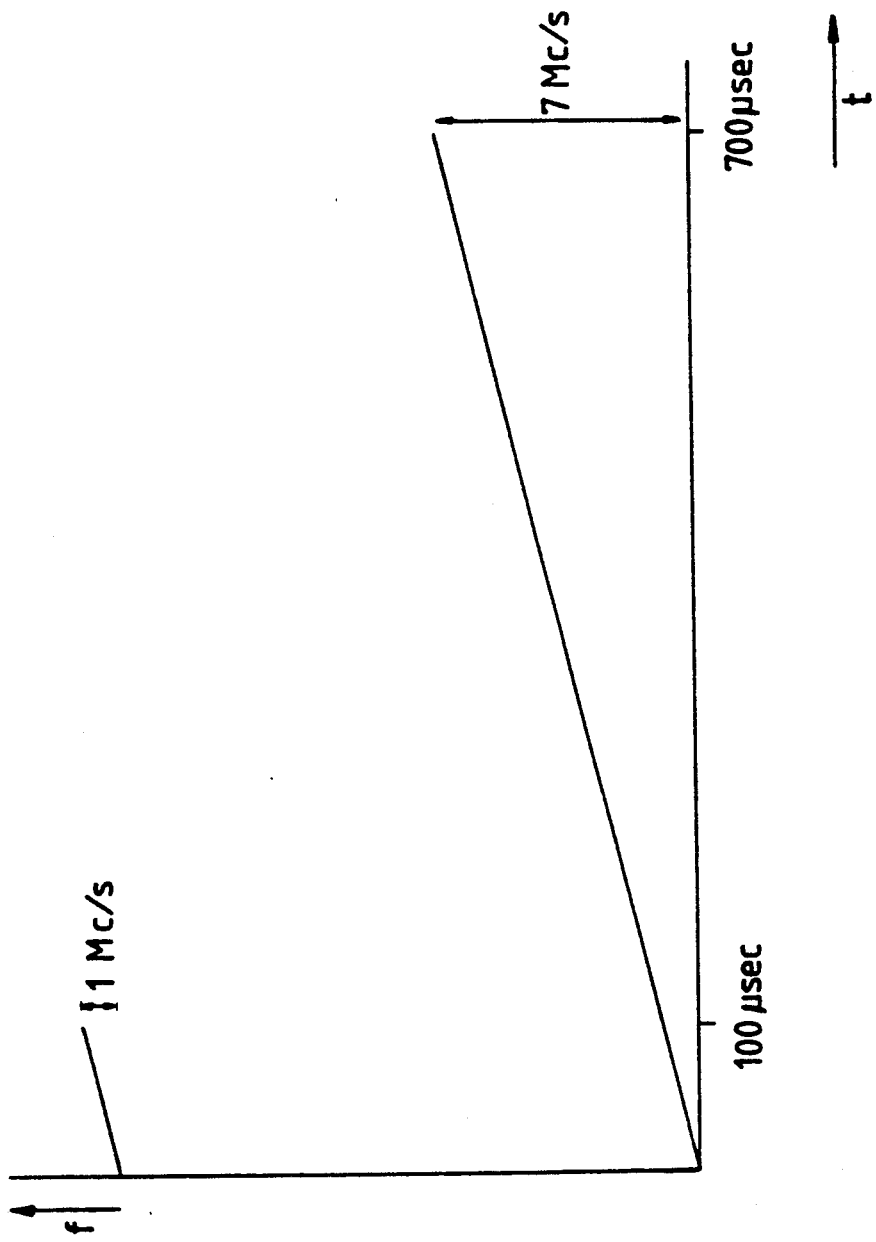
FIG. 2 represents a possible transmitter pulse and a possible reference signal in a radar apparatus according to the invention.

In a first favourable embodiment of a radar apparatus according to the invention, a transmitter pulse is emitted with a frequency sweep of 1 Mc/s in 100 μsec. The start frequency of the reference signal is selected 16 Mc/s lower than the start frequency of the transmitter pulse, the frequency sweep is 7 Mc/s in 700 μsec. This is illustrated in FIG. 2.

Targets at a very short range will then produce heterodyne signals of 16 Mc/s, at 15 km distance, 15 Mc/s, at 30 km distance, 14 Mc/s, etc. A dispersive delay element 4 can be implemented according to the well-known imcon technology, on the basis of the parameters:

| | |
|---|---|
| bandwidth | 5 Mc/s |
| dispersiveness | 500 μsec |
| centre frequency | 12.5 Mc/s |
| weighting | none |

If said heterodyne signals are applied to this dispersive delay element 4, echoes of targets between 15 and 90 km will simultaneously appear at the output of the dispersive delay element 4, in a time window of 100 μsec. By means of a quadrature detector, incorporated in Fourier transformation unit 5, provided with a 12.5 Mc/s reference signal, a quadrature video is produced and sampled at a clock frequency of 5 Mc/s. The 500 resulting complex samples are then weighted with a $\cos^2$ weighting, provided with an inverse Fresnel ripple calculated by means of formula (11) using the above-mentioned parameters. Subsequently, a 512-point FFT is performed, resulting in 512 range quants.

The radar apparatus can be provided with an STC, as is usual in a pulse radar apparatus. This STC will inevitably cause pulse distortion and consequently time sidelobes. A more favourable solution is to apply the STC in the frequency domain, as is usual in an FMCW radar apparatus. To this effect the frequency characteristic of an amplifier, for instance incorporated between mixer stage 3 and dispersive delay element 4, may be selected such that an attenuation for close, consequently high-frequency targets is obtained. Another possibility is to provide the dispersive delay element 4 with a weighting which realises the STC in the frequency domain.

Figure 3:
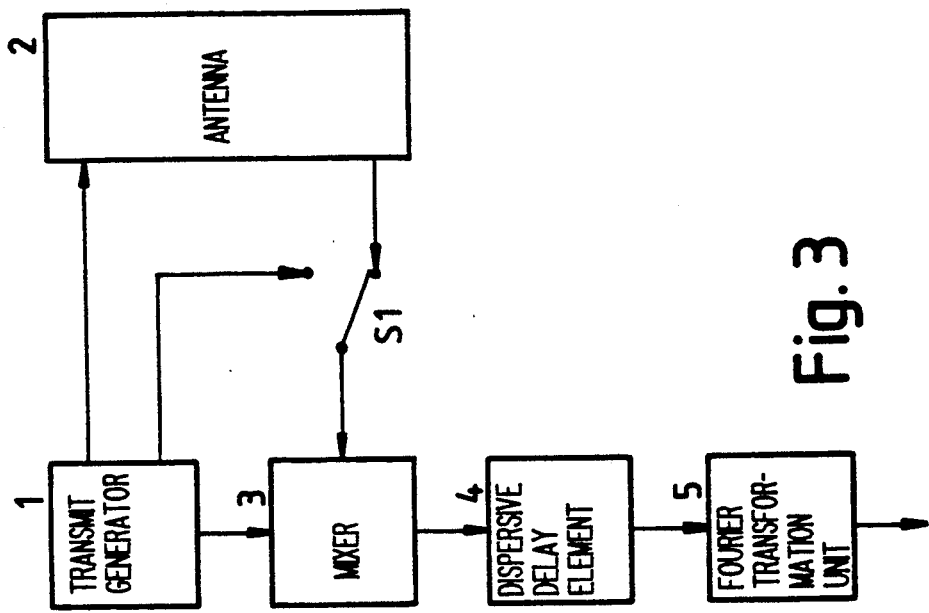
FIG. 3 represents a block diagram of a radar apparatus according to the invention in which calibration means are provided for correction of the transmitter pulse distortion.

A second favourable embodiment of the radar apparatus is represented in FIG. 3 and has for its object to provide an application of the invention which also corrects the transmitter pulse distortion. The transmitter pulse will generally show droop and ripple and will moreover often provide a tapering for the transmitter pulse which depends on the degree of saturation of a transmitter output stage in transmit generator 1.

To this end, the radar apparatus is equipped with a switch S1 which during operation connects antenna means 2 and mixer stage 3, but which during system calibration applies calibration pulse originating from transmit generator 1 to mixer stage 3. The calibration pulse is derived from the transmitter pulse and is attenuated such as to prevent overload of mixer stage 3. During system calibration, the start frequency of the transmitter pulse is moreover reduced to such an extent that the derived heterodyne signal will be within the passband of dispersive delay element 4. Thus, the calibration pulse generates an artificial target. In this embodiment the Fourier transformation unit is provided with a digital signal processor, which also performs the weighting; an embodiment well-known in the art. An exceptional aspect is, however, that during system calibration, the signal processor runs a calibration program which determines the distortion of the heterodyne signal originating from the calibration pulse and generates a weighting function which eliminates this distortion. This is possible since the distortion is on the one hand caused by the transmit generator and is therefore identical for all targets; on the other hand the distortion is caused by the dispersive delay element 4 and will, according to formula (11), also be identical for all targets. This periodical system calibration results in a radar apparatus with favourable time sidelobes which is suitable for driving a radar dsiplay or a track computer.

For applications which require the radar apparatus to be Doppler-tolerant, it is important to reduce the Fresnel ripple, since a heterodyne signal originating from a moving target leaves the dispersive delay element somewhat shifted in time, so that Fresnel ripple and inverse Fresnel ripple do not fully match. As shown in formula (11), a tapering of the transmitter pulse will then be the obvious means.

We claim:
1. A radar apparatus comprising:
a transmitter means for generating a transmitter pulse modulated at a predetermined frequency sweep rate and a reference signal modulated at the predetermined frequency sweep rate;
an antenna means for radiating the generated transmitter pulse and reference signal and for receiving reflected transmitter pulse and reference signals;
a receiver means comprising a mixer stage for receiving the reflected transmitter pulse and reference signals from the antenna means and for generating a heterodyne signal from the received reflected transmitter pulse and reference signals;
a dispersive delay element for receiving the heterodyne signal from the receiver means and for frequency-dependent delaying the heterodyne signal; and
a Fourier transformation means comprising:
a correction means having a weighting means for transforming the delayed heterodyne signal output by the dispersive delay element for correcting distortion of the delayed heterodyne signal to generate a corrected heterodyne signal; and
Fourier transforming means for Fourier transforming the corrected heterodyne signal.
2. A radar apparatus as claimed in claim 1, wherein the correction means comprises means for modifying the weighting function.
3. A radar apparatus as claimed in claim 2, wherein the correction means further comprises means for dividing the weighting function by a first function which describes the distortion of the heterodyne signal in the dispersive delay element.
4. A radar apparatus as claimed in claim 2, wherein the correction further means comprises means for dividing the weighting function by a first function which describes the distortion of the transmitter pulse in the transmitter means and of the heterodyne signal in the dispersive delay element.
5. A radar apparatus as claimed in claim 4, further comprising means for analysing a signal distorted in the transmitter means and the dispersive delay element in order to obtain the first function.
6. A radar apparatus as claimed in claim 5, wherein the means for analysing a distorted signal comprises a digital signal processor.
7. A radar apparatus as claimed in either one of claims 5 or 6, wherein the transmitter means comprises means for generating a calibration pulse and the receiver means comprises an input device for injecting the calibration pulse.
8. A radar apparatus as claimed in claim 7, wherein the frequency of the calibration pulse is such that the frequency of a heterodyne signal originating from the calibration pulse will be within a pass-band of the dispersive delay element.
9. A radar apparatus as claimed in claim 8, wherein the means for analysing a distorted signal is activated concurrently with the calibration pulse.
10. A radar apparatus as claimed in claim 2, wherein the receiver means comprises an STC, realized in a frequency domain.
11. A radar apparatus as claimed in claim 2, wherein the transmitter pulse is provided with a tapering.
12. A radar apparatus comprising:
a transmitter for generating a transmitter pulse and a reference signal modulated at a same predetermined frequency sweep rate;
an antenna for radiating the generated transmitter pulse and reference signal and for receiving reflected transmitter pulse and reference signals;
a receiver comprising a mixer for receiving the reflected transmitter pulse and reference signals from the antenna and for generating a heterodyne signal from the received reflected transmitter pulse and reference signals;
a dispersive delay element for receiving the heterodyne signal from the receiver and for frequency-dependent delaying the heterodyne signal; and
a Fourier transformation circuit comprising:
a correction circuit having a weighting means for transforming the delayed heterodyne signal output by the dispersive delay element for correct- ing distortion of the delayed heterodyne signal to generate a corrected heterodyne signal; and
Fourier transforming means for Fourier transforming the corrected heterodyne signal.

13. A radar apparatus as claimed in claim 12, wherein the correction circuit comprises means for modifying the weighting function.

14. A radar apparatus as claimed in claim 13, wherein the correction circuit further comprises means for dividing the weighting function by a first function which describes the distortion of the heterodyne signal in the dispersive delay element.

15. A radar apparatus as claimed in claim 14, wherein the correction circuit further comprises means for dividing the weighting function by a first function which describes the distortion of the heterodyne signal in the dispersive delay element.

16. A radar apparatus as claimed in claim 15, further comprising means for analysing a signal distorted in the transmitter and the dispersive delay element in order to obtain the first function.

17. A radar apparatus as claimed in claim 16, wherein the means for analysing a distorted signal comprises a digital signal processor.

18. A radar apparatus as claimed in either of claims 16 and 17, wherein the transmitter comprises means for generating a calibration pulse and the receiver comprises an input device for injecting the calibration pulse.

19. A radar apparatus as claimed in claim 18, wherein the frequency of the calibration pulse is such that the frequency of a heterodyne signal originating from the calibration pulse will be within a pass-band of the dispersive delay element.

20. A radar apparatus as claimed in claim 19, wherein the means for analysing a distorted signal is activated concurrently with the calibration pulse.

21. A radar apparatus as claimed in claim 12, wherein the receiver comprises an STC, realized in a frequency domain.

22. A radar apparatus as claimed in claim 12, wherein the transmitter pulse is provided with a tapering.

* * * * *

UNITED STATES PATENT AND TRADEMARK OFFICE
CERTIFICATE OF CORRECTION

PATENT NO. : 5,329,284
DATED : JULY 12, 1994
INVENTOR(S) : ALBERT GROENENBOOM ET AL

It is certified that error appears in the above-indentified patent and that said Letters Patent is hereby corrected as shown below:

In column 5, line 60, delete "and reference signal".

In column 5, line 61, delete "and reference".

In column 5, line 63, delete "and reference".

In column 5, line 66, delete "and reference"; at the same line, after "signals" add --and the reference signal--.

In column 6, line 55, delete "and reference".

In column 6, line 56, delete "and reference".

In column 6, line 58, delete "and reference".

In column 6, line 60, delete "and".

In column 6, line 61, delete "reference"; at the same line, after "signals" add --and the reference signal--.

Signed and Sealed this

Seventh Day of February, 1995

*Attest:*

BRUCE LEHMAN

*Attesting Officer*      *Commissioner of Patents and Trademarks*